United States Patent
Rhelimi et al.

(10) Patent No.: US 10,915,634 B2
(45) Date of Patent: Feb. 9, 2021

(54) SECURE ELEMENT WITH SHARED MEMORIES, FOR A MULTI-IMAGE OWNER DEVICE

(71) Applicant: GEMALTO SA, Meudon (FR)

(72) Inventors: Alain Rhelimi, Meudon (FR); Serge Barbe, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 332 days.

(21) Appl. No.: 15/572,118

(22) PCT Filed: Apr. 18, 2016

(86) PCT No.: PCT/EP2016/058570
§ 371 (c)(1),
(2) Date: Nov. 6, 2017

(87) PCT Pub. No.: WO2016/177564
PCT Pub. Date: Nov. 10, 2016

(65) Prior Publication Data
US 2018/0144137 A1    May 24, 2018

(30) Foreign Application Priority Data
May 5, 2015 (EP) ..................... 15305685

(51) Int. Cl.
*G06F 12/00* (2006.01)
*G06F 21/57* (2013.01)
(Continued)

(52) U.S. Cl.
CPC ............ *G06F 21/575* (2013.01); *G06F 21/77* (2013.01); *G06F 9/4401* (2013.01); *G06F 21/76* (2013.01)

(58) Field of Classification Search
CPC ........ G06F 21/575; G06F 21/77; G06F 21/76; G06F 9/4401
See application file for complete search history.

(56) References Cited

U.S. PATENT DOCUMENTS

2002/0052914 A1* 5/2002 Zalewski ............ G06F 9/5077
709/203
2007/0243934 A1* 10/2007 Little .................. G07F 17/3213
463/40

(Continued)

FOREIGN PATENT DOCUMENTS

WO     2012050933 A1    4/2012

OTHER PUBLICATIONS

PCT/EP2016/058570, International Search Report, dated May 30, 2016, European Patent Office, P.B. 5818 Patentlaan 2 NL-2280 HV Rijswijk.

*Primary Examiner* — Kalpit Parikh
(74) *Attorney, Agent, or Firm* — The Jansson Firm; Pehr B. Jansson

(57) ABSTRACT

A secure element equips a device usable by N image owners, and comprises a first non-volatile memory divided into N parts storing image owner data, a second non-volatile memory storing a primary boot loader, a third non-volatile memory divided into N parts storing image owner session private data, a first random access memory divided into N parts associated to the N first non-volatile memory parts, a second random access memory for temporarily storing image owner data during an access session, and a controller activated by the primary boot loader when the device starts an access session, and then controlling accesses to the non-volatile memories and random access memories according to rules, and erasing the second random access memory each time the device starts an access session.

17 Claims, 1 Drawing Sheet

(51) Int. Cl.
    *G06F 21/77*     (2013.01)
    *G06F 9/4401*     (2018.01)
    *G06F 21/76*     (2013.01)

(56) References Cited

U.S. PATENT DOCUMENTS

2012/0159090 A1* 6/2012 Andrews ............... G06F 9/5061
                                                             711/153
2012/0303941 A1   11/2012 Grieco
2014/0075567 A1    3/2014 Raleigh

* cited by examiner

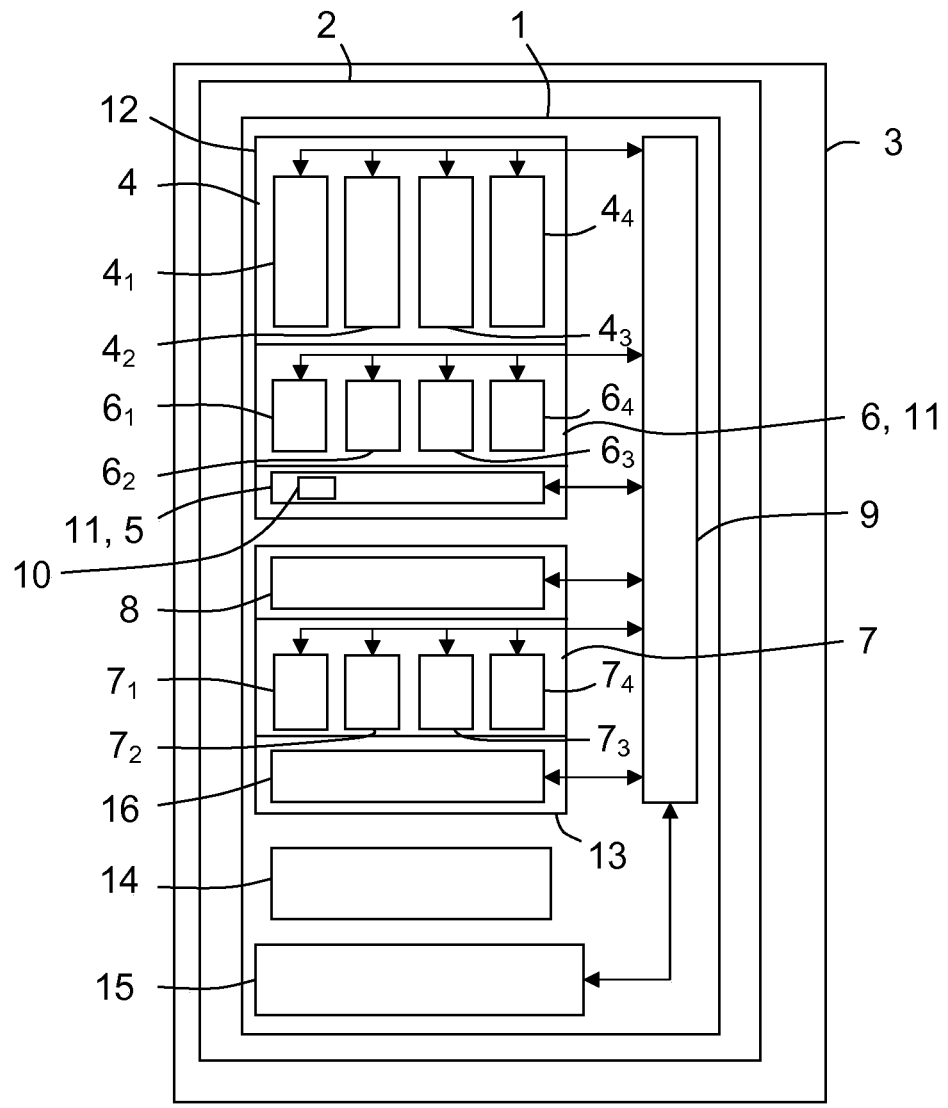

SECURE ELEMENT WITH SHARED MEMORIES, FOR A MULTI-IMAGE OWNER DEVICE

TECHNICAL FIELD

The present invention relates to secure elements (or modules) equipping devices (or hardware hosts) that may be used by several image owners for at least one user, to share efficiently hardware resources.

For instance and for illustration purpose only, the device (or host) may be a mobile phone (or a part of a mobile phone) supporting, with a single secure element, multiple users each having at least one subscription with at least one MNO ("Mobile Network Operator") or a single user having at least two subscriptions with MNOs.

It is important to note that the invention concerns any embedded or removable secure element hosting at least one Operating System (or OS) offering access to generic and specific services customized according to requirements from at least one user managed by at least one image owner. So, a secure element may be a SIM (or UICC) card, or a smart card, or a chip card, or a physical representation of an embedded secure element within a System On Chip (or SoC), or else an integrated circuit card, for instance.

BACKGROUND OF THE INVENTION

In the following description it will be considered that an image owner is a commercial entity that has contracted services with service providers (e.g. a Mobile Network Operator, a Bank, or a Mass Transit Operator) on behalf of a (end) user and has purchased an image from an image maker, an image maker is an entity that has built an image, and an image is a structured and encrypted representation of binary information stored in a memory of a secure element and embedding means for decrypting encapsulated data, managing rights and checking integrity of loaded decrypted data.

In order a secure element of a device (or hardware host) be accessed by a single image owner, it only needs a non-volatile memory (or NVM) and a random access memory (or RAM) for storing the image of an image owner, the image owner private data and the data relative to a session.

To ease the reading of the invention description, the word "session" will designate all elements related to an image owner.

But, when a secure element of a device (or hardware host) must act as several "virtual" secure elements for several image owners, it needs several CPUs and associated peripherals, several non-volatile memories (or NVMs) and several random access memories (or RAMs) respectively dedicated to these image owners. So, hardware resources are duplicated without being shared, which increases notably the secure element bulkiness and cost and does not allow transfer of private data from a first memory domain dedicated to a first image owner to a second memory domain (NVM and RAM) dedicated to a second image owner.

SUMMARY OF THE INVENTION

So, an objective of the invention is to improve the situation, and more precisely to allow a single secure element to be shared between multiple image owners having possibly different security policies and/or different requirements, while sharing sequentially the more hardware resources as possible to reduce cost and bulkiness. The aforesaid secure element is driven by external commands from a device (or host) that is in charge of accessing a session for a given image owner according to the context of application(s).

To this effect the invention provides notably a secure element, intended for equipping a device (or host) that can be used by N image owners, with N≥2, and comprising:
  a first non-volatile memory divided into N parts arranged for storing respectively data of the N image owners, defining notably images to be loaded, and for overlapping same addresses,
  a second non-volatile memory arranged for storing a primary boot loader that is arranged for loading an image of an image owner or launching an operating system related to an image during a session of access of an image owner to the secure element,
  a third non-volatile memory divided into N parts arranged for storing respectively image owner session private data relative to the primary boot loader,
  a first random access memory divided into N parts associated respectively to these N parts of the first non-volatile memory and overlapping same addresses,
  a second random access memory overlapping same addresses and arranged for temporarily storing data of an image owner during an access session, and
  a controller arranged for being activated via the primary boot loader when the device (or host) starts an access session by sending a dedicated command, and then for controlling accesses to the non-volatile memories and random access memories according to at least one predefined rule, and for erasing the second random access memory each time the device (or host) starts an access session.

The secure element according to the invention may include additional characteristics considered separately or combined, and notably:
  it may further comprise a third random access memory arranged for temporarily storing private data of an image owner during a transfer of these private data from one of the first random access memory parts to a predefined destination first random access memory part;
  each rule may be chosen from a group comprising at least a programming of the different parts that is persistent against power cycles of the non-volatile memories, a definition of the size of each part is performed once and/or is irreversible or can be reprogrammable if all parts are fully erased, a selection of a part by the controller is not persistent against a power cycle, a switching of part generates a virtual reset of peripherals of the secure element except the controller, a switching to a given first non-volatile memory part is performed via a command provided by the device (or host), there is only one image owner access session at a given time, private data of an image owner stored into an associated first random access memory part are transferable into a predefined destination first random access memory part via a third random access memory, and in case of switch from a first non-volatile memory part to another first non-volatile memory part that is not associated to the destination first random access memory part into which private data of this first non-volatile memory part are transferable via a third random access memory, then this third random access memory is erased;

at least one of the first random access memory parts, overlapping the same addresses, may be arranged for storing at least one volatile image owner secret code.

The invention also provides a device intended for being used by N image owners, with N≥2, and comprising at least one secure element such as the one above introduced.

For instance, such a device may define a system on chip (or SoC) in which the secure element is embedded. In a variant, the secure element may be removable.

The invention also provides an apparatus comprising at least one device such as the one above introduced.

BRIEF DESCRIPTION OF THE FIGURE

Other features and advantages of the invention will become apparent on examining the detailed specifications hereafter and the appended drawing, wherein the unique FIGURE schematically and functionally illustrates an example of apparatus comprising an example of embodiment of a system on chip comprising an example of embodiment of a secure element according to the invention.

DETAILED DESCRIPTION OF THE PREFERRED EMBODIMENT

The appended drawing may serve not only to complete the invention, but also to contribute to its definition, if need be.

The invention aims, notably, at offering a secure element 1 intended for equipping a device 2 that can be used by N image owners for at least one user, with N≥2.

In the following description it will be considered, as an example, that the device 2 is a system on chip (or SoC) with an embedded secure element 1. But the invention is not limited to this type of device. It concerns any device (or hardware host) that may be used by several image owners (for at least one user) and that comprises at least one embedded or removable secure element (or module).

For instance, this system on chip 2 is an application processor. But it could be any SoC having a fast access to fast non-volatile memory (or NVM), and notably an ASIC, a FPGA or a microcontroller.

Also for instance, the secure element 1 may be a SIM (or UICC) card, a smart card or a chip card or else an integrated circuit card.

Moreover, in the following description it will be considered, as an example, that the device 2 is intended for equipping an apparatus 3 that is a personal computer. But the invention is not limited to this type of apparatus. It concerns any OEM ("Original Equipment Manufacturer") equipment comprising at least one device 2, and notably a smart phone, an electronic tablet, a smart watch, a laptop, or a game console.

In the example illustrated in the unique FIGURE, the apparatus 3 comprises a device (here a system on chip) 2 containing a secure element (or module) 1 according to the invention.

This secure element 1 stores, in NVM memories $4_n$, N images belonging to N image owners and associated respectively to different sets of requirements.

It is recalled that an image is a structured and encrypted representation of binary information comprising means for decrypting encapsulated data, managing rights and checking integrity of loaded decrypted data.

As illustrated, a secure element 1 according to the invention comprises at least a first non-volatile memory (or NVM) 4, a second non-volatile memory (or NVM) 5, a third non-volatile memory (or NVM) 6, a first random access memory (or RAM) 7, a second random access memory (or RAM) 8, and a controller 9.

The first non-volatile memory 4 is divided into N parts $4_n$ (n=1 to N) arranged for storing respectively data of the N image owners, which defines notably images to be loaded, and for overlapping same addresses during the execution of a given access session (this principle emulates the well-known "programming overlay" technique but the overlay area is dedicated to an access session). So, these N parts $4_n$ (which are remapped at the supposed user NVM origin) are called the user NVM parts hereafter, and the first non-volatile memory 4 defines a user NVM area that is dedicated to the N authorized image owners of the secure element 1.

In the non-limiting example illustrated in the unique FIGURE, the first non-volatile memory 4 is divided into four parts $4_1$ to $4_4$ (n=1 to 4, and N=4).

But the first non-volatile memory 4 may be divided into any number N of parts $4_n$, since this number N is at least equal to two (N≥2).

The second non-volatile memory 5 is arranged for storing a primary boot loader (or PBL) 10 that is arranged, when activated, for loading an image of an image owner or launching (or bootstrapping) an operating system (or OS) related to an image during a session of access of this image owner to the secure element 1 (and therefore to its device 2) or for administrating the image (e.g. for deletion). So, a common NVM 5 is dedicated by the "vendor" (i.e. a silicon manufacturer) of the secure element 1 to all the N image owners.

Preferably, this second non-volatile memory 5 stores also primitives for the NVM management and tests/audit means.

The third non-volatile memory 6 is divided into N parts $6_n$ arranged for storing respectively the private data of the image owner sessions relative to the primary boot loader 10, and notably the loaded image and some confidential data managed by the image owner and the OS related to this loaded image. So, each part $6_n$ is dedicated by the vendor to a user (vendor perspective), which allows each user to have its own vendor session NVM $6_n$.

The second 5 and third 6 non-volatile memories are preferably two sub-parts of the same NVM area 11 that is dedicated to the vendor. So, this area is called the vendor memory area hereafter.

Preferably, the user NVM area 4 and the vendor NVM area 11 are two parts of a single NVM memory 12 that may be, for instance, a FLASH memory.

The first random access memory 7 is divided into N parts $7_n$ associated respectively to the N parts $4_n$ of the first non-volatile memory 4 and overlapping same addresses. So, these N parts $7_n$ (which are remapped at the supposed user RAM origin) are called the user RAM parts hereafter, and the first random access memory 7 defines a user RAM area that is dedicated to the N authorized image owners of the secure element 1.

These user RAM parts $7_n$ are independent one from the other, and each user RAM part $7_n$ dedicated to an image owner cannot be accessible during the access session of another image owner and cannot be erased when the secure element 1 switches from a user NVM part $4_n$ to another user NVM part $4_{n'}$ (with n'≠n) to allow another authorized image owner to start an access session.

For instance, at least one of the user RAM parts $7_n$ may store at least one volatile user secret code, such as a pin code.

The second random access memory 8 is overlapping same addresses and is arranged for temporarily storing data (e.g. all OS and application volatile variables, the stacks, the heap) of an image owner during an access session. So, this second random access memory 8 is systematically erased after any access session switch and is called the shared RAM hereafter.

Preferably, the user RAM area 7 and the shared RAM 8 are two parts of a single main RAM 13.

This controller 9 is arranged for being activated via the primary boot loader 10 when the device (or host) 2 starts an access session by sending a dedicated command to the secure element 1. This controller 9 is arranged for controlling accesses to the non-volatile memories 4-6 and the random access memories 7-8 according to at least one predefined rule, and for erasing the second random access memory (or user RAM area) 7 each time the device (or host) 2 starts an image owner access session.

So, thanks to the invention each image owner has the full control of his own memory domain (NVM/RAM) via the controller 9.

It is important to note, as illustrated and as known by those skilled in the art, that the secure element 1 further comprises at least a central processing unit (or CPU) 14 and peripherals 15 (connected to the controller 9). More, although this is not illustrated in the unique FIGURE, the secure element 1 also comprises a memory management unit (or MMU) or a memory protection unit (or MPU), a direct memory access (or DMA) element, communications means (e.g. a UART ("Universal Asynchronous Receiver/Transmitter"), a bus), and specific peripherals, such as security sensors and crypto processor, for instance.

For instance, each rule may be chosen in the following non-exhaustive list:
- a programming of the different parts n that is persistent against power cycles of the non-volatile memories 4-6,
- a definition of the size of each part n is performed once and/or is irreversible or can be reprogrammable if all parts n are fully erased,
- a selection of an image owner NVM part $4_n$ by the controller 9 is not persistent against a power cycle,
- a switching of an image owner NVM part $4_n$ to another image owner NVM part $4_{n'}$ generates a virtual reset of peripherals 15 including the CPU 14 but except the controller 9,
- a switching from an image owner NVM part $4_n$ to a given image owner NVM part $4_{n'}$ is performed via a command provided by the device 2,
- there is only one access session of an image owner at a given time,
- private data of an image owner stored into an associated image owner RAM part $7_n$ are transferable into a predefined destination image owner RAM part $7_{n'}$ via an optional third random access memory 16 (described hereafter),
- in case of switch from an image owner NVM part $4_n$ to another image owner NVM part $4_{n'}$ that is not associated to the destination image owner RAM part $7_n$ into which private data of this image owner NVM part $4_n$ are transferable via the optional third random access memory 16, then this third random access memory 16 is erased.

In the preceding rules, a power cycle is a cycle of electric power supply of the secure element 1.

Preferably and as illustrated in the unique FIGURE, the secure element 1 further comprises a third random access memory 16 that is arranged for temporarily store private data of an image owner during a transfer of these image owner private data from an image owner RAM part $7_n$ to a predefined destination image owner RAM part $7_{n'}$ (with $n' \neq n$). To this effect, the third random access memory 16 may comprises a first part (or originator part) and a second part (or recipient (or destination) part) defining the transfer direction. The registers of the originator and recipient parts can be read by any memory part, then by any OS related to any image. The recipient part register is only writable by the running OS related to an access session.

So, this third random access memory 16 may be called a "shuttle RAM". If the secure element 1 switches from an image owner NVM part $4_n$ to another image owner NVM part $4_{n''}$ ($n'' \neq n$) that is not associated to the predefined destination image owner RAM part $7_{n'}$ into which private data of this image owner NVM part $4_n$ are authorized to be transferred from the image owner RAM part $7_n$, to allow another authorized image owner to start an access session, then the controller 9 erases the shuttle RAM 16.

Such a shuttle RAM 16 may, for instance, allow transferring private data from a first application of an image owner to a second application related to the same image owner or to different image owners.

The data to be transferred may be enciphered or non-enciphered before reaching the shuttle RAM 16, and the data transfer may comprise an encrypting or decrypting step using negotiated keys between image owners, or may be performed without encryption (in peer to peer) because the shuttle RAM 16 is not accessible by the device (or host) 2 and other parts than the ones involved in the transaction.

Preferably, the shuttle RAM 16 is a third part of the main RAM 13.

A detailed example of use of the secure element 1 from the beginning of an access session of a image owner to the end of this access session is given hereafter, as an example The device (or host) 2 may activate an access session for a first image owner. Then the image related to this first image owner may write its certificate into the shuttle RAM 16 and set the recipient part register of the latter (16) to a second image owner.

Then the device (or host) 2 may activate an access session for the second image owner. The image related to this second image owner reads and verifies the (e.g. ECC/RSA) certificate of the first image owner (by reading the originator part register of the shuttle RAM 16), then writes its certificate into the shuttle RAM 16 and sets the recipient part register of the latter (16) to the first image owner.

Then the device (or host) 2 may activate an access session for the first image owner. The image related to the first image owner reads and verifies the certificate from the second image owner (by reading the originator part register of the shuttle RAM 16).

So, both first and second image owners can securely exchange data even without encryption by using the shuttle RAM 16 and know the source of the data by reading the originator part register without performing a mutual authentication.

The invention offers several advantages, and notably:
- it allows to securely emulate N virtual secure elements with PBL capability in a single physical secure element,
- it allows an optimal hardware resources sharing, at reduced cost, based on a secure element design based on a usual secure microcontroller,
- it allows solving possible conflicts in terms of image owner requirements (e.g. between OS and services) and/or security policy between several image owners,
- it may allow a secure transfer of enciphered/non-enciphered data between associated memory parts, via a shuttle RAM, it allows the processing of persistent data in NVM context as it is usually done on secure elements supporting a single image owner, it allows each image owner memory domain to partially backup a volatile RAM context, it may allow each image owner memory domain (or part) size to be programmable.

The invention is not limited to the embodiments of secure element, device, and apparatus described above, only as examples, but it encompasses all alternative embodiments which may be considered by one skilled in the art within the scope of the claims hereafter.

The invention claimed is:

1. A secure element for a device intended for being used by N image owners, with N>2, comprising:
   a) a first nonvolatile memory divided into N parts each part operable to store, respectively, data of said N image owners, defining notably images to be loaded wherein an image is a structure and encrypted representation of binary information,
   b) a second non-volatile memory storing a primary boot loader operable to load an image or launching an operating system related to an image during a session of access of an image owner to said secure element,
   c) a third non-volatile memory divided into N parts each part operable to store, respectively, image owner session private data relative to said primary boot loader,
   d) a first random access memory divided into N parts associated respectively to said N parts of said first non-volatile memory,
   e) a second random access memory operable to temporarily store data of an image owner during an access session,
   f) a third random access memory temporarily storing private data of a first image owner during a transfer of said first image owner private data from a first random access memory first part (originator part) to a first random access memory second part (predefined destination part), and
   g) a controller activated via said primary boot loader in response to said device starting an access session by sending a dedicated command, and operable to control accesses to said non-volatile memories and said random access memories according to at least one predefined rule, and operable to erase said second random access memory each time said device starts an access session.

2. The secure element according to claim 1, wherein each rule is chosen from a group comprising a programming of said different parts that is persistent against power cycles of said non-volatile memories, a definition of the size of each part is performed once and/or is irreversible or can be reprogrammable if all parts are fully erased, a selection of a part by said controller is not persistent against a power cycle, a switching of first non-volatile memory part generates a virtual reset of peripherals of said secure element except said controller, a switching to a given first non-volatile memory part is performed via a command provided by said device, there is only one image owner access session at a given time, private data of an image owner stored into a first random access memory first part, are transferable into a first random access memory second part via the third random access memory, and in case of switch from a first non-volatile memory part to another first non-volatile memory part that is not associated to the first random access memory second part into which private data of said first non-volatile memory part are transferable via the third random access memory, then said third random access memory is erased.

3. The secure element according to claim 1, wherein at least one of said first random access memory parts is arranged for storing at least one volatile image owner secret code.

4. The secure element according to claim 1, wherein each rule is chosen from a group comprising a programming of said different parts that is persistent against power cycles of said non-volatile memories, a definition of the size of each part is performed once and/or is irreversible or can be reprogrammable if all parts are fully erased, a selection of a part by said controller is not persistent against a power cycle, a switching of first non-volatile memory part generates a virtual reset of peripherals of said secure element except said controller, a switching to a given first non-volatile memory part is performed via a command provided by said device, there is only one image owner access session at a given time, private data of an image owner stored into a first random access memory first part, are transferable into a first random access memory second part via the third random access memory, and in case of switch from a first non-volatile memory part to another first non-volatile memory part that is not associated to the first random access memory second part into which private data of said first non-volatile memory part are transferable via the third random access memory, then said third random access memory is erased.

5. The secure element according to claim 1, wherein at least one of said first random access memory parts is arranged for storing at least one volatile image owner secret code.

6. The secure element according to claim 2, wherein at least one of said first random access memory parts_stores at least one volatile image owner secret code.

7. A device intended for being used by N image owners, with N>2, comprising: at least one secure element having:
   a) a first non-volatile memory divided into N parts each part operable to store, respectively, data of said N image owners, defining notably images to be loaded wherein an image is a structure and encrypted representation of binary information,
   b) a second non-volatile memory arranged for storing a primary boot loader operable to load an image or launching an operating system related to an image during a session of access of an image owner to said secure element,
   c) a third non-volatile memory divided into N parts each part operable to store, respectively, image owner session private data relative to said primary boot loader,
   d) a first random access memory divided into N parts associated respectively to said N parts of said first non-volatile memory,
   e) a second random access memory operable to temporarily store data of an image owner during an access session,
   f) a third random access memory temporarily storing private data of an image owner during a transfer of said image owner private data from a first random access memory first part (originator part) to a first random access memory second part (predefined destination part), and
   g) a controller activated via said primary boot loader in response to said device starting an access session by sending a dedicated command, and operable to control accesses to said non-volatile memories and said random access memories according to at least one predefined rule, and operable to erase said second random access memory each time said device starts an access session.

8. The device according to claim 7, wherein said device is a system on chip in which said secure element is embedded.

9. The device according to claim 7, wherein said secure element is removable.

10. The device according to claim 7 wherein each rule is chosen from a group comprising a programming of said different parts that is persistent against power cycles of said non-volatile memories, a definition of the size of each part is performed once and/or is irreversible or can be reprogrammable if all parts are fully erased, a selection of a part by said controller is not persistent against a power cycle, a switching of first non-volatile memory part generates a virtual reset of peripherals of said secure element except said controller, a switching to a given first non-volatile memory part is performed via a command provided by said device, there is only one image owner access session at a given time, private data of an image owner stored into a first random access memory first part, are transferable into a first random access memory second part via the third random access memory, and in case of switch from a first non-volatile memory part to another first non-volatile memory part that is not associated to the first random access memory second part into which private data of said first non-volatile memory part are transferable via the third random access memory, then said third random access memory is erased.

11. The device according to claim 7, wherein each rule is chosen from a group comprising a programming of said different parts that is persistent against power cycles of said non-volatile memories, a definition of the size of each part is performed once and/or is irreversible or can be reprogrammable if all parts are fully erased, a selection of a part by said controller is not persistent against a power cycle, a switching of first non-volatile memory part generates a virtual reset of peripherals of said secure element except said controller, a switching to a given first non-volatile memory part is performed via a command provided by said device, there is only one image owner access session at a given time, private data of an image owner stored into a first random access memory first part, are transferable into a first random access memory second part via the third random access memory, and in case of switch from a first non-volatile memory part to another first non-volatile memory part that is not associated to the first random access memory second part into which private data of said first non-volatile memory part are transferable via the third random access memory, then said third random access memory is erased.

12. The device according to claim 7 wherein at least one of said first random access memory parts_stores at least one volatile image owner secret code.

13. The device according to claim 7 wherein at least one of said first random access memory parts is arranged for storing at least one volatile image owner secret code.

14. The device according to claim 10 wherein at least one of said first random access memory parts is arranged for storing at least one volatile image owner secret code.

15. An apparatus, comprising at least one device having at least one secure element having:
   a) a first non-volatile memory divided into N parts each part operable to store, respectively, data of said N image owners, defining notably images to be loaded wherein an image is a structure and encrypted representation of binary information,
   b) a second non-volatile memory storing a primary boot loader operable to load an image or launching an operating system related to an image during a session of access of an image owner to said secure element,
   c) a third non-volatile memory divided into N parts each part operable to store, respectively, image owner session private data relative to said primary boot loader,
   d) a first random access memory divided into N parts associated respectively to said N parts of said first non-volatile memory,
   e) a second random access memory and arranged for temporarily storing data of an image owner during an access session,
   f) a third random access memory temporarily storing private data of an image owner during a transfer of said image owner private data from a first random access memory first part (originator part) to a first random access memory second part (predefined destination part), and
   g) a controller activated via said primary boot loader in response to said device starting an access session by sending a dedicated command, and operable to control accesses to said non-volatile memories and said random access memories according to at least one predefined rule, and operable to erase said second random access memory each time said device starts an access session.

16. The apparatus according to claim 15 wherein each rule is chosen from a group comprising a programming of said different parts that is persistent against power cycles of said non-volatile memories, a definition of the size of each part is performed once and/or is irreversible or can be reprogrammable if all parts are fully erased, a selection of a part by said controller is not persistent against a power cycle, a switching of first non-volatile memory part generates a virtual reset of peripherals of said secure element except said controller, a switching to a given first non-volatile memory part is performed via a command provided by said device, there is only one image owner access session at a given time, private data of an image owner stored into a first random access memory first part, are transferable into a first random access memory second part via the third random access memory, and in case of switch from a first non-volatile memory part to another first non-volatile memory part that is not associated to the first random access memory second part into which private data of said first non-volatile memory part are transferable via the third random access memory, then said third random access memory is erased.

17. The apparatus according to claim 15, wherein at least one of said first random access memory parts is arranged for storing at least one volatile image owner secret code.

* * * * *